(12) United States Patent
Jones

(10) Patent No.: US 9,198,202 B2
(45) Date of Patent: Nov. 24, 2015

(54) DEFAULT CIVIC ADDRESS LOCATIONS FOR MOBILE E9-1-1 CALLS

(75) Inventor: Douglas R. Jones, Medford, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 750 days.

(21) Appl. No.: 12/782,005

(22) Filed: May 18, 2010

(65) Prior Publication Data

US 2011/0287737 A1    Nov. 24, 2011

(51) Int. Cl.
*H04W 76/00* (2009.01)
*H04W 64/00* (2009.01)
*H04W 4/22* (2009.01)

(52) U.S. Cl.
CPC .............. *H04W 76/007* (2013.01); *H04W 4/22* (2013.01); *H04W 64/00* (2013.01)

(58) Field of Classification Search
CPC ....... H04W 4/22; H04W 76/007; H04W 4/02; H04W 64/00; H04W 40/02; H04W 4/021; H04W 4/04; H04M 11/04; H04M 2242/30; H04M 1/72541; H04M 3/5116; H04M 1/2745; H04M 1/72572; H04M 2242/04; H04M 2242/01; H04M 3/42; H04M 3/42042; H04M 3/42195; H04M 3/42348; H04M 3/42357; H04M 3/51; H04M 7/0024; H04M 7/006; G01S 19/42; G01S 2205/006; G01S 5/0027; H04L 67/18; H04L 65/1069; G08B 25/016

USPC .................. 455/404.1–404.2, 456.1–457
See application file for complete search history.

(56) References Cited

U.S. PATENT DOCUMENTS

| | | | | |
|---|---|---|---|---|
| 6,138,026 | A * | 10/2000 | Irvin .......................... | 455/456.3 |
| 6,532,360 | B1 * | 3/2003 | Shaffer ..................... | 455/404.1 |
| 6,640,106 | B2 * | 10/2003 | Gutowski et al. .......... | 455/456.1 |
| 6,757,544 | B2 * | 6/2004 | Rangarajan et al. ....... | 455/456.1 |
| 6,768,910 | B2 * | 7/2004 | Gutowski et al. .......... | 455/456.1 |
| 7,260,186 | B2 * | 8/2007 | Zhu et al. ................... | 379/45 |
| 7,428,417 | B2 * | 9/2008 | Caspi et al. ................ | 455/456.1 |
| 7,586,877 | B2 * | 9/2009 | Gits et al. .................. | 370/331 |
| 2004/0072583 | A1 * | 4/2004 | Weng ......................... | 455/456.3 |
| 2004/0105529 | A1 * | 6/2004 | Salvucci et al. ............ | 379/45 |
| 2004/0239498 | A1 * | 12/2004 | Miller ....................... | 340/539.13 |
| 2010/0190466 | A1 * | 7/2010 | Borislow et al. .......... | 455/404.2 |
| 2011/0111728 | A1 * | 5/2011 | Ferguson et al. ......... | 455/404.2 |
| 2011/0201299 | A1 * | 8/2011 | Kamdar ..................... | 455/404.1 |

* cited by examiner

*Primary Examiner* — Matthew Sams

(57) ABSTRACT

A device obtains a geographic position of a mobile telephone. The device retrieves geographic locations associated with multiple different civic addresses from memory, and determines if the geographic position is within a certain proximity of one of the geographic locations. The device retrieves a civic address of the multiple different civic addresses, that is associated with the one of the geographic locations, from the memory for use in identifying the civic address at which the mobile telephone is located.

24 Claims, 14 Drawing Sheets

| MOBILE DEVICE ID 720 | GEOGRAPHIC LOCATION 740 | PROXIMITY 750 | DEFAULT CIVIC ADDRESS 730 | PSAP EMAIL ADDRESS 760 |
| --- | --- | --- | --- | --- |
| mobile_ID_1 | geo_pos_1 | prox_1 | civic_address_1 | psap@town1.gov |
| mobile_ID_2 | geo_pos_2 | prox_2 | civic_address_2 | psap@town1.gov |
| mobile_ID_3 | geo_pos_3 | prox_3 | civic_address_3 | psap@town2.gov |
| mobile_ID_4 | geo_pos_4 | prox_4 | civic_address_4 | psap@town3.gov |
| ... | ... | ... | ... | ... |

TABLE 700

ENTRIES 710

DEFAULT CIVIC ADDRESS LOCATIONS FOR MOBILE E9-1-1 CALLS

BACKGROUND

Landline service associated with Plain Old Telephone Service (POTS) typically enables POTS telephones to make emergency 9-1-1 (E9-1-1) calls to Public Safety Answering Points (PSAPs) to have emergency services (e.g., fire, police, or ambulance services) directed to the locations of the users of the land-line POTS telephones. Such landline E9-1-1 service also typically includes the ability of the emergency 9-1-1 Public Safety Answering Points (PSAPs) to quickly associate a caller's telephone number with a specific civic address (i.e., a street address). However, when emergency 9-1-1 calls are conducted from mobile, wireless devices, such as from mobile telephones, the specific civic address (including floor or room designations) from which the E9-1-1 call has been placed cannot currently be easily or accurately obtained and supplied to the PSAPs.

BRIEF DESCRIPTION OF THE DRAWINGS

FIG. 7 illustrates an exemplary table that may be stored by the Mobile Positioning Center or mobile device of FIG. 2;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein enable the determination of a default civic address associated with a location of a mobile device initiating an emergency 9-1-1 call. Geographic locations associated with each of multiple default civic addresses may be stored in memory in conjunction with a respective proximity parameter. At the time a mobile device initiates an emergency 9-1-1 call, a geographic position of the mobile device may be determined, and the geographic position may be compared with the stored geographic locations to determine if the geographic position is within a distance less than a respective proximity parameter of one of the stored geographic locations. If the geographic position of the mobile device is within a distance less than a respective proximity parameter of one of the stored geographic locations, a corresponding default civic address may be retrieved from memory and returned to the Public Safety Answering Point (PSAP) so that the PSAP may identify the civic address from which the E9-1-1 was made. A "civic address," as referred to herein, includes a street address, and possibly additionally includes building, floor and/or room designations within buildings located at the street address.

Figure 1:
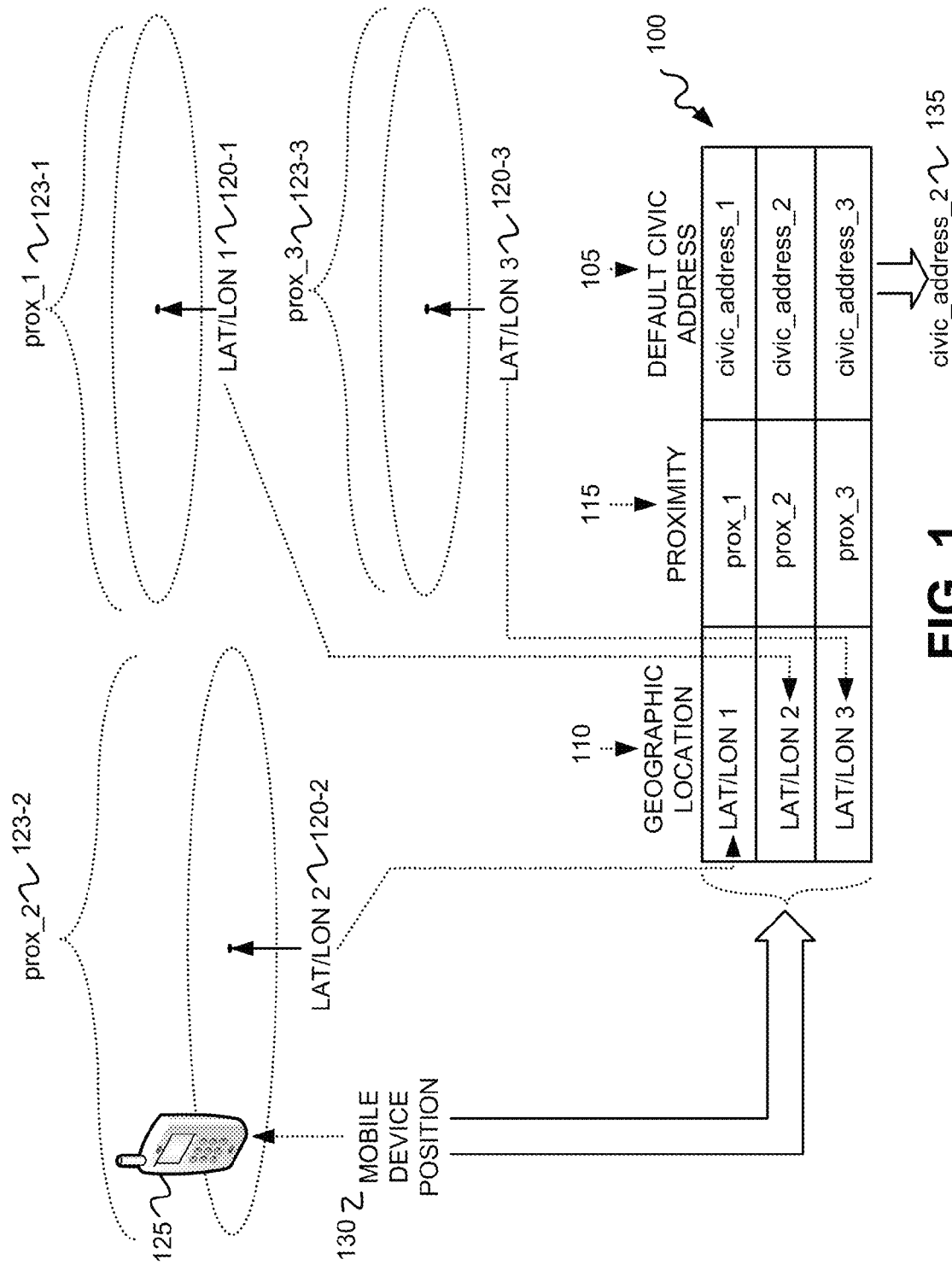
FIG. 1 is a diagram of an overview of the determination of a default civic address associated with a mobile device's position when the mobile device makes an emergency 9-1-1 call.

FIG. 1 is a diagram of an overview of a system for determining default civic addresses associated with a mobile device's position when the mobile device makes an emergency 9-1-1 call. A user of a mobile device 125 may associate, via a table 100, multiple default civic addresses 105 with respective geographic locations 110 and proximity parameters 115. As shown in FIG. 1, each geographic location 110 may include a latitude and longitude (e.g., lat/lon 1 120-1, lat/lon 2 120-2, lat/lon 3 120-3) that specifies a geographic location of a respective civic address 105. Each geographic location 110 may further be associated with a respective proximity parameter 115 (e.g., proximity parameters prox_1 123-1, prox_2 123-2 and prox_3 123-3). Each proximity parameter 115 may specify a distance from a respective geographic location 110 that mobile device 125 may be located to be considered to be located at a corresponding default civic address 105. For example, as shown in FIG. 1, mobile device 125 may be located at a position 130 that is within a distance corresponding to proximity parameter prox_2 123-2 of lat/lon 2 120-2. Since mobile device 125's position 130 is within the distance corresponding to proximity parameter prox_2 123-2, a default civic address 135 (e.g., civic_address_2) may be retrieved from table 100 and provided as the civic address at which mobile device 125 is located. Default civic address 135 may be supplied to a Public Safety Answering Point (PSAP) to identify a current location of mobile device 125 when mobile device 125 initiates an emergency 9-1-1 call to the PSAP. Table 100 may include additional fields not shown in FIG. 1 (e.g., as described below with respect to FIG. 7).

Figure 2:
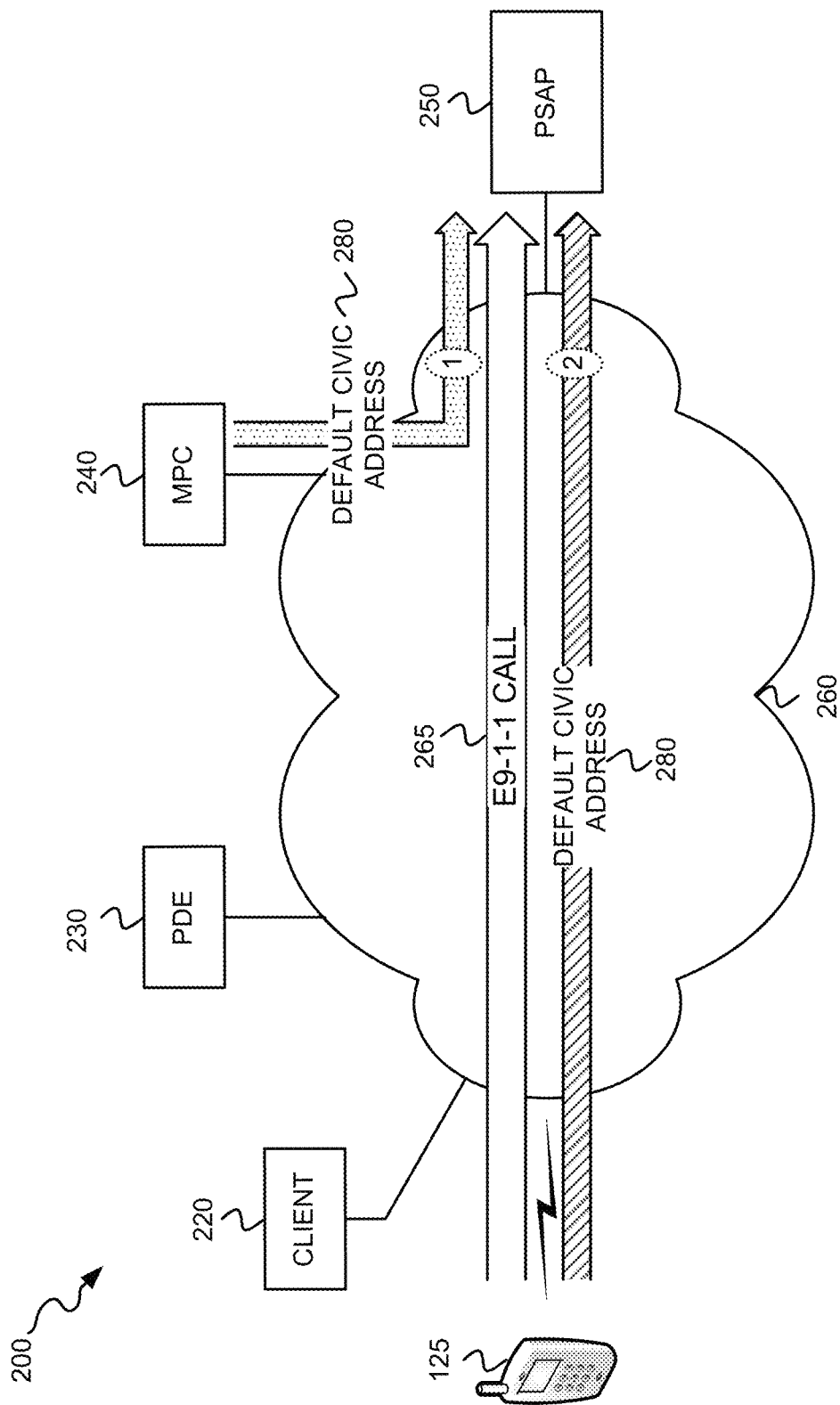
FIG. 2 is a diagram that depicts an exemplary environment, in which default civic addresses associated with a mobile device's position at the time the mobile device engages in an emergency 9-1-1 call, may be determined

FIG. 2 is a diagram that depicts an exemplary environment 200, in which default civic addresses associated with a mobile device's position at the time the mobile device engages in an emergency 9-1-1 call, may be determined. As shown in FIG. 2, environment 200 may include mobile device 125, a client 220, Positioning Determining Equipment (PDE) 230, a Mobile Positioning Center (MPC) 240, and a PSAP 250 connected to a network 260.

Mobile device 125 may include any type of mobile communications device such as, for example, a cellular radiotelephone, a personal digital assistant (PDA), a laptop and/or palmtop receiver, or any other type of mobile appliance that includes a radio frequency wireless transceiver. In some implementations, mobile device 125 may include a fixed or semi-fixed wireless appliance that includes a radio frequency wireless transceiver. For example, mobile device 125 may include a semi-fixed cellular-based device that provides connectivity to a cellular network for one or more cordless handsets in a home or small office environment (i.e., the cordless handsets connect to the cellular network via a cellular-based platform). In other implementations, mobile device 125 may include a land-line telephone that may include functionality for connecting to a cellular network via a Bluetooth link to an active cellular telephone that establishes a connection with the cellular network.

Client 220 may include a client entity that may be used to provide default civic addresses, geographic locations and proximity parameters to MPC 240 via network 260. Alternatively, mobile device 125 may be used to provide the default civic addresses, geographic locations and proximity parameters to MPC 240. In another implementation, mobile device 125 and/or client 220 may provide the default civic addresses, geographic locations and proximity parameters to a server (not shown), which may store the data for provision to MPC 240. PDE 230 may include one or more devices that determine geographic position information (e.g., latitude/longitude information) associated with a position of a mobile device (e.g., mobile device 125) engaging in an E9-1-1 call. In one implementation, PDE 230 may include functionality for determining a geographic position, or for assisting in determining a geographic position, of a mobile device. MPC 240 may include a device that may use geographic position information, provided by mobile device 125 or PDE 230, to retrieve a default civic address associated with a geographic position of mobile device 125. PSAP 250 may include a call center that is responsible for answering emergency calls (e.g., E9-1-1 calls) for emergency services, such as, for example, police, firefighting, and/or ambulance services. An operator at PSAP 250 may use the default civic address information, associated with a geographic position of mobile device 125, to dispatch emergency services to the default civic address.

Network 260 may include one or more networks, such as, for example, a local area network (LAN), a wide area network (WAN), a metropolitan area network (MAN), an intranet, the Internet, a wireless satellite network, a cable network (e.g., an optical cable network), and/or a wireless public land mobile network (PLMN). Environment 200 may include additional, fewer and/or different components than those depicted in FIG. 2.

As shown with respect to environment 200 depicted in FIG. 2, mobile device 125 may initiate an E9-1-1 call 265 with PSAP 250. In response to the initiation of E9-1-1 call 265, MPC 240 or mobile device 125 may provide a default civic address 280 to PSAP 250 (e.g., default civic address 280 identified as "1" when sent from MPC 240 to PSAP 250, and identified as "2" when sent from mobile device 125 to PSAP 250). An operator at PSAP 250 may use default civic address 280 to dispatch emergency services. In some implementations, default civic address 280 may be provided to PSAP 250 via a Short Message Service (SMS) text message, an Instant Message (IM), an email, or via other types of electronic messages. In other implementations, default civic address 280 may be provided via an audio recording (e.g., pre-recorded by the user of mobile device 125) which includes an audio message that specifies the default civic address. In an implementation in which mobile device 125 provides default civic address 280 to PSAP 250, mobile device 125 may inject the audio message on the voice path for the E9-1-1 call when the E9-1-1 call is placed to PSAP 250. The message sent from mobile device 125 or MPC 240 (e.g., SMS text, IM, email, audio recording, etc.) may include information about the owner of mobile device 125, such as, for example, medical information about the owner that the owner may wish first responders to be aware of.

FIG. 2 depicts a single PSAP 250 being connected to network 260. However, multiple PSAPs may exist to service E9-1-1 calls depending, for example, on the geographic region from which mobile device 125 initiates an E9-1-1 call.

Figure 3:
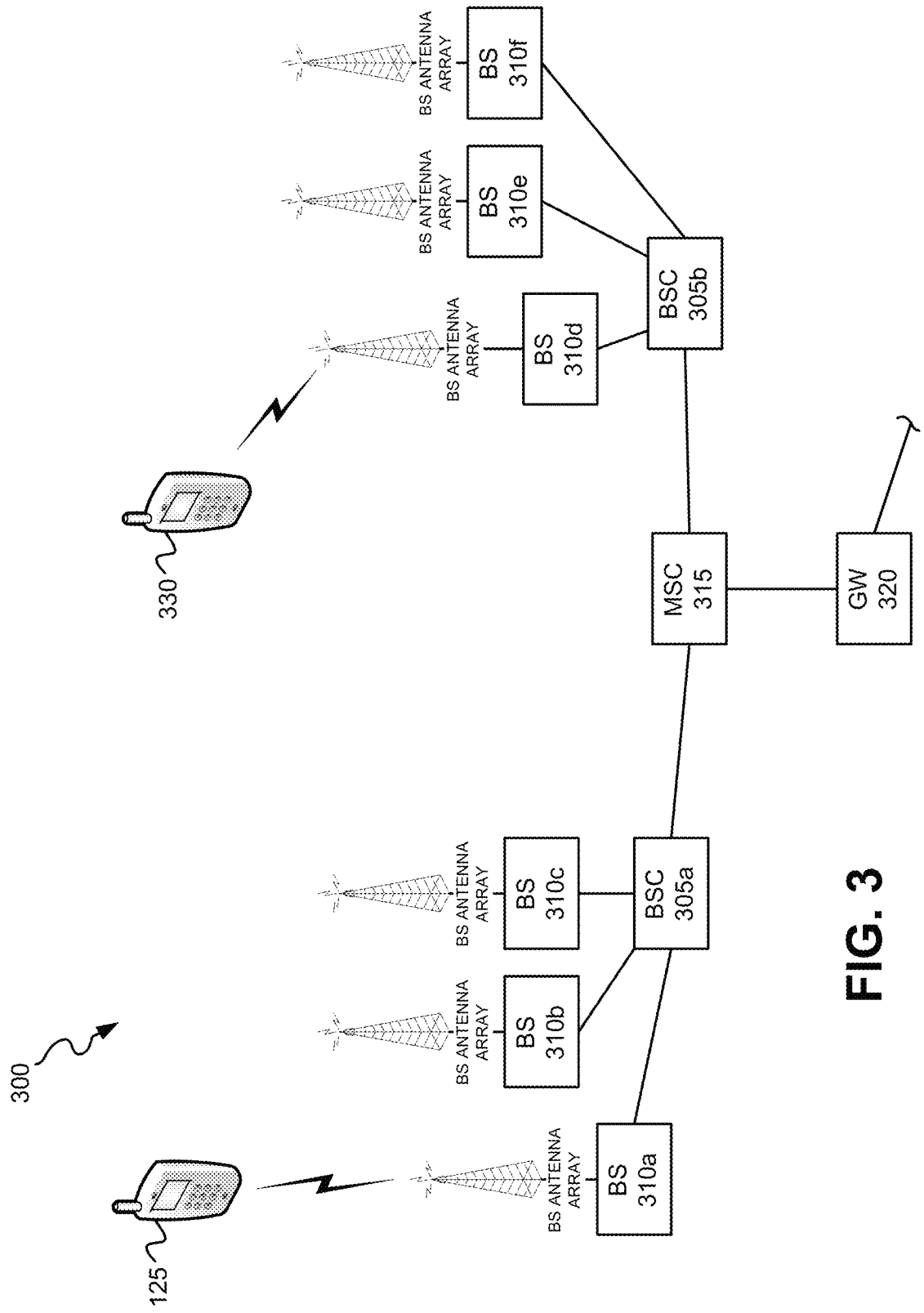
FIG. 3 illustrates an example of a Public Land Mobile Network that may be included as part of the network of FIG. 2.

FIG. 3 illustrates an example of a PLMN 300 that may be included as part of network 260 of FIG. 2. As shown in FIG. 3, mobile device 125 may communicate with another device (e.g., mobile device 330) via PLMN 300.

PLMN 300 may include one or more base station controllers (BSCs) 305*a*-305*b* (alternatively called "radio network controllers" (RNCs) in some implementations), multiple base stations (BSs) 310*a*-310*f* along with their associated antenna arrays, one or more mobile switching centers (MSCs), such as MSC 315, and one or more gateways (GWs), such as GW 320.

Base stations 310*a*-310*f* may format the data transmitted to, or received from, the antenna arrays in accordance with existing techniques and may communicate with BSCs 305*a*-305*b* or a device, such as mobile device 330. Among other functions, BSCs 305*a*-305*b* may route received data to either MSC 315 or to a base station (e.g., BSs 310*a*-310*c* or 310*d*-310*f*). MSC 315 may route received data to BSC 305*a* or 305*b*. During an emergency call from mobile device 125, MSC 315 may, in some implementations, send a device identifier (e.g., telephone number), MSC identifier, and/or cell site/sector identifier to MPC 240 of FIG. 2. GW 320 may also route data received from an external domain (not shown) to an appropriate MSC (such as MSC 315), or from an MSC to an appropriate external domain. For example, the external domain may include the Internet or a PSTN.

Figure 4:
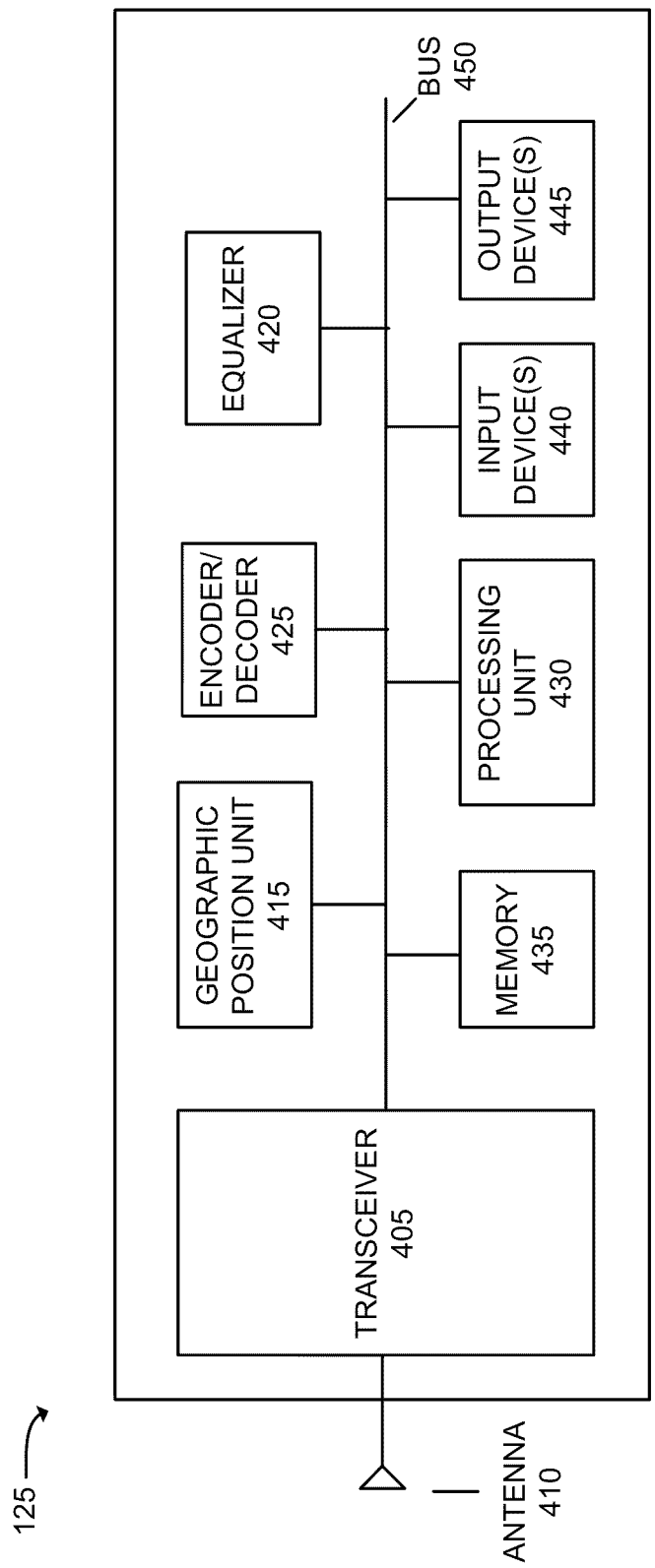
FIG. 4 illustrates one exemplary implementation of the mobile device of FIG. 2.

FIG. 4 illustrates one exemplary implementation of mobile device 125. Mobile device 125 may include a transceiver 405, an antenna 410, a geographic position unit 415, an equalizer 420, an encoder/decoder 425, a processing unit 430, a memory 435, an input device(s) 440, an output device(s) 445, and a bus 450.

Transceiver 405 may include transceiver circuitry for transmitting and/or receiving symbol sequences using radio frequency signals via antenna 410. Transceiver 405 may include, for example, a RAKE or a GRAKE receiver. Geographic position unit 415 may include circuitry for identifying a geographic position of mobile device 125. For example, unit 415 may include Global Positioning System (GPS) circuitry, or assisted GPS (aGPS) circuitry, for identifying a geographic position of mobile device 125. Equalizer 420 may store and implement Viterbi trellises for estimating received symbol sequences using, for example, a maximum likelihood sequence estimation technique. Equalizer 420 may additionally include mechanisms for performing channel estimation. Encoder/decoder 425 may include circuitry for decoding and/or encoding received or transmitted symbol sequences.

Processing unit 430 may include a processor, microprocessor, or processing logic that may interpret and execute instructions. Processing unit 430 may perform all data processing functions for inputting, outputting, and processing of data including data buffering and device control functions, such as call processing control, user interface control, or the like. Memory 435 may provide permanent, semi-permanent, or temporary working storage of data and instructions for use by processing unit 430 in performing device processing functions. Memory 435 may include read only memory (ROM), random access memory (RAM), large-capacity storage devices, such as a magnetic and/or optical recording medium and its corresponding drive, and/or other types of memory devices. Input device(s) 440 may permit entry of data into mobile device 125. For example, input device(s) 420 may include a key pad (not shown), a microphone (not shown) or a display unit (not shown). The microphone can include mechanisms for converting auditory input into electrical signals. The display unit may include a screen display that may provide a user interface (e.g., a graphical user interface) that can be used by a user for selecting device functions. The screen display of the display unit may include any type of visual display, such as, for example, a liquid crystal display (LCD), a plasma screen display, a light-emitting diode (LED) display, a cathode ray tube (CRT) display, an organic light-emitting diode (OLED) display, etc.

Output device(s) 445 may include mechanisms for outputting data in video, audio, and/or hard copy format. For example, output device(s) 445 may include a speaker (not shown) that includes mechanisms for converting electrical signals into auditory output. Output device(s) 445 may further include a display unit that displays output data to the user. For example, the display unit may provide a graphical user interface that displays output data to the user.

Bus 450 may interconnect the various components of mobile device 125 to permit the components to communicate with one another. The configuration of components of mobile device 125 illustrated in FIG. 4 is for illustrative purposes only. One skilled in the art will recognize that other configurations may be implemented.

Figure 5:
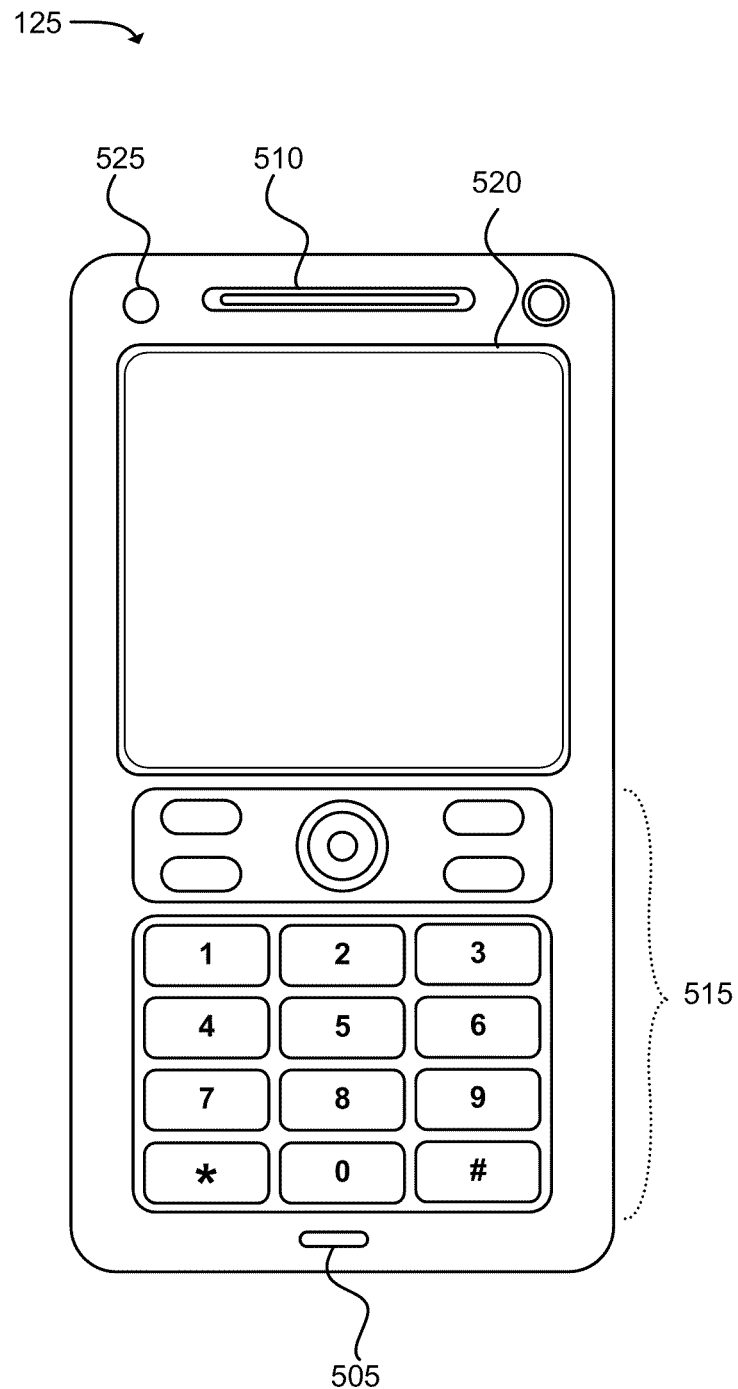
FIG. 5 illustrates an exemplary implementation of the mobile device of FIG. 2 in which the mobile device includes a cellular radiotelephone.

FIG. 5 illustrates an exemplary implementation of mobile device 125 in which mobile device 125 includes a cellular radiotelephone. As shown in FIG. 5, the cellular radiotelephone may include a microphone 505 (e.g., of input device(s) 440) for entering audio information into device 125, a speaker 510 (e.g., of output device(s) 445) for providing an audio output from device 125, a keypad 515 (e.g., of input device(s) 440) for manual entry of data or selection of device functions, and a display 520 (e.g., of input device(s) 440 or output device(s) 445) that may visually display data to the user and/or which may provide a user interface that the user may use to enter data or to select device functions (in conjunction with keypad 515).

Figure 6:
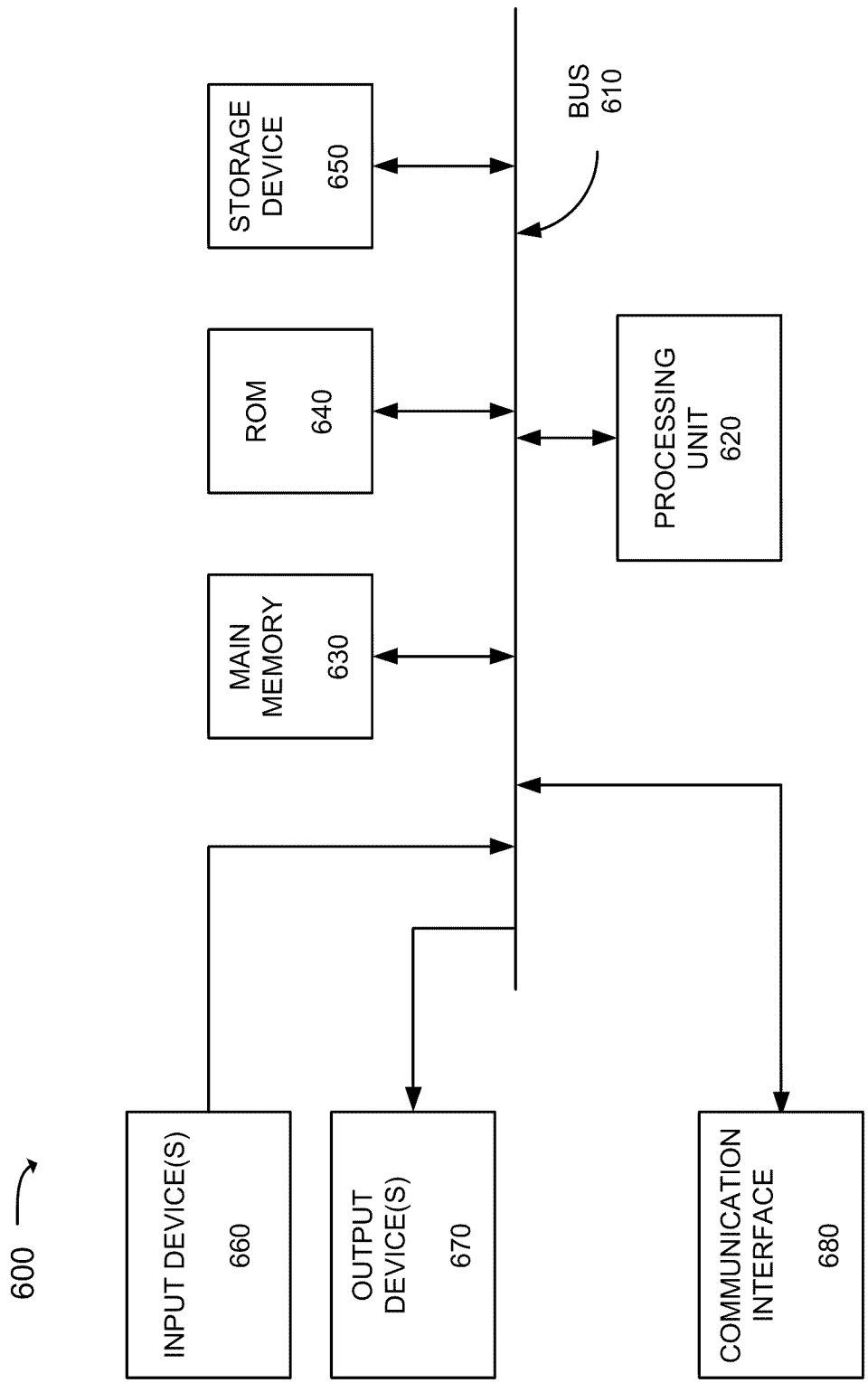
FIG. 6 is a diagram of exemplary components of a device which may correspond to various devices of FIG. 2.

FIG. 6 is a diagram of exemplary components of a device 600, which may correspond to MPC 240, PDE 230, client 220 and/or PSAP 250. Device 600 may include a bus 610, a processing unit 620, a main memory 630, a read only memory (ROM) 640, a storage device 650, an input device(s) 660, an output device(s) 670, and a communication interface 680. Bus 610 may include a path that permits communication among the elements of device 600.

Processing unit 620 may include a processor, microprocessor, or processing logic that may interpret and execute instructions. Main memory 630 may include a random access memory (RAM) or another type of dynamic storage device that may store information and instructions for execution by processing unit 620. ROM 640 may include a ROM device or another type of static storage device that may store static information and instructions for use by processing unit 620. Storage device 650 may include a magnetic and/or optical recording medium and its corresponding drive.

Input device(s) 660 may include one or more mechanisms that permit an operator to input information to device 600, such as, for example, a keypad or a keyboard, voice recognition and/or biometric mechanisms, etc. Output device(s) 670 may include one or more mechanisms that output information to the operator, including a display, a speaker, etc. Communication interface 680 may include any transceiver mechanism that enables device 600 to communicate with other devices and/or systems. For example, communication interface 680 may include mechanisms for communicating with another device or system via a network, such as network 260.

Device 600 may perform certain operations or processes, as may be described in detail below. Device 600 may perform these operations in response to processing unit 620 executing software instructions contained in a computer-readable medium, such as memory 630. A computer-readable medium may be defined as a physical or logical memory device. A logical memory device may include memory space within a single physical memory device or spread across multiple physical memory devices.

The software instructions may be read into main memory 630 from another computer-readable medium, such as storage device 650, or from another device via communication interface 680. The software instructions contained in main memory 630 may cause processing unit 620 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

FIG. 7 illustrates an exemplary table 700 that may be stored by MPC 240 in memory (e.g., main memory 630 or storage device 650). Alternatively, table 700 may be stored by mobile device 125 in memory 330. Table 700 may include multiple entries 710, each of which may include a mobile device identifier (ID) field 720, a default civic address field 730, a geographic location field 740, a proximity parameter field 750, and a PSAP email address 760. Table 700 may correspond to table 100 of FIG. 1 (with, however, additional fields included).

Mobile device ID field 720 may include a unique identifier for mobile device 125. The unique identifier may include, for example, a telephone number or electronic serial number (ESN) of mobile device 125. If table 700 is stored at mobile device 125, then mobile device ID field 720 may be unnecessary. Default civic address field 730 may include a street address to which emergency services may be dispatched if mobile device 125 initiates an emergency call to PSAP 250. Default civic address field 730 may additionally include a building designation, a floor designation, and/or a room designation within buildings located at the street address. Geographic location field 740 may include geographic location information (e.g., latitude and longitude information) associated with a corresponding default civic address stored in default civic address field 730 further stored in a corresponding entry 710 of table 700. Proximity parameter field 750 may include a distance value that may be used to determine whether a geographic position of mobile device 125 is within the proximity of the geographic location stored in geographic location field 740. For example, a value for proximity parameter field 750 of 200 meters may indicate that mobile device 125 should be within 200 meters of the geographic location stored in geographic location field 740 for mobile device 125 to be considered to be located at the corresponding default civic address stored in default civic address field 730. PSAP email address field 760 may store an email address of the PSAP that serves the mobile device identified in the corresponding mobile device ID field 720 at the street address in the corresponding default civic address 730. Alternatively, or in addition to an email address, field 760 may store a Short Message Service (SMS) address or a Multimedia Message Service (MMS) address associated with the PSAP that serves the mobile device identified in the corresponding mobile device ID field 720 at the street address in the corresponding default civic address 730.

Figure 8:
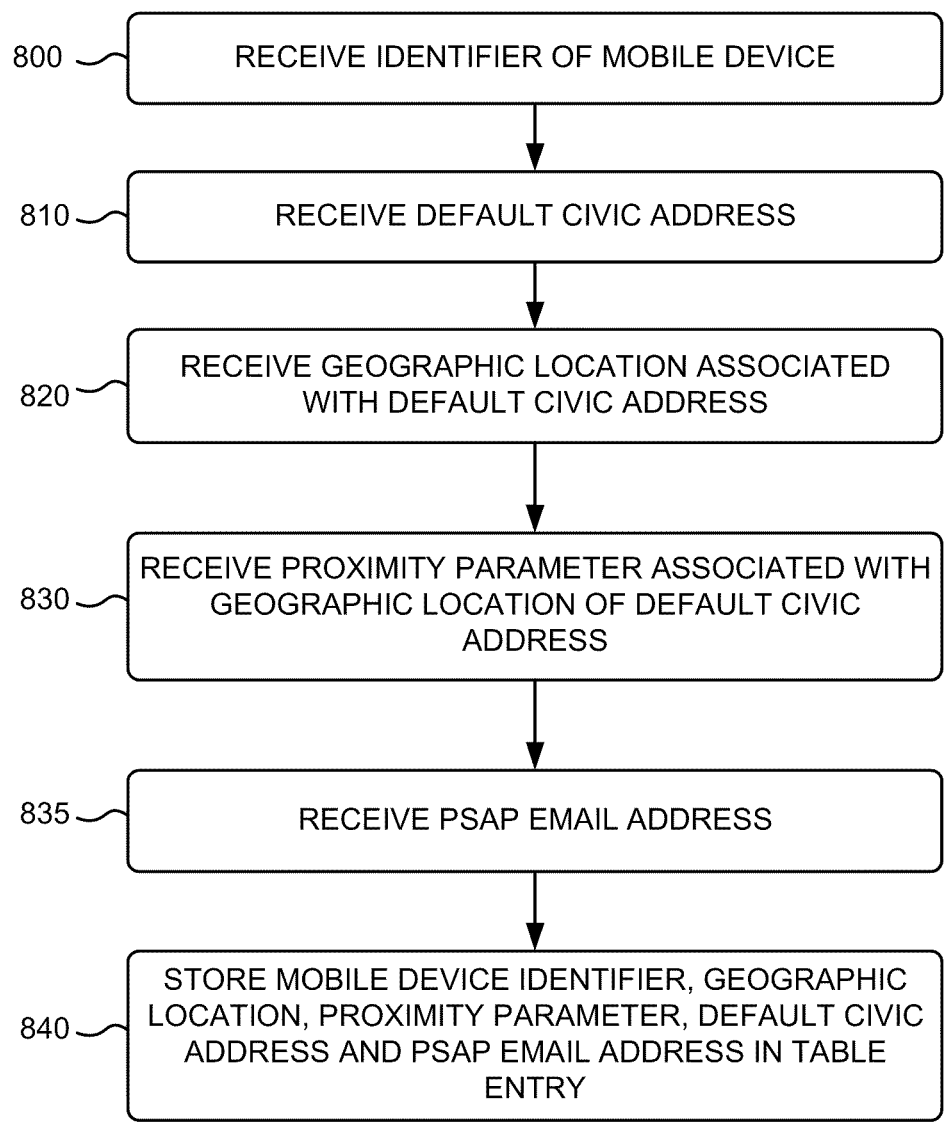
FIG. 8 is a flow diagram illustrating an exemplary process for receiving and storing default civic addresses and associated data.
Figure 10:
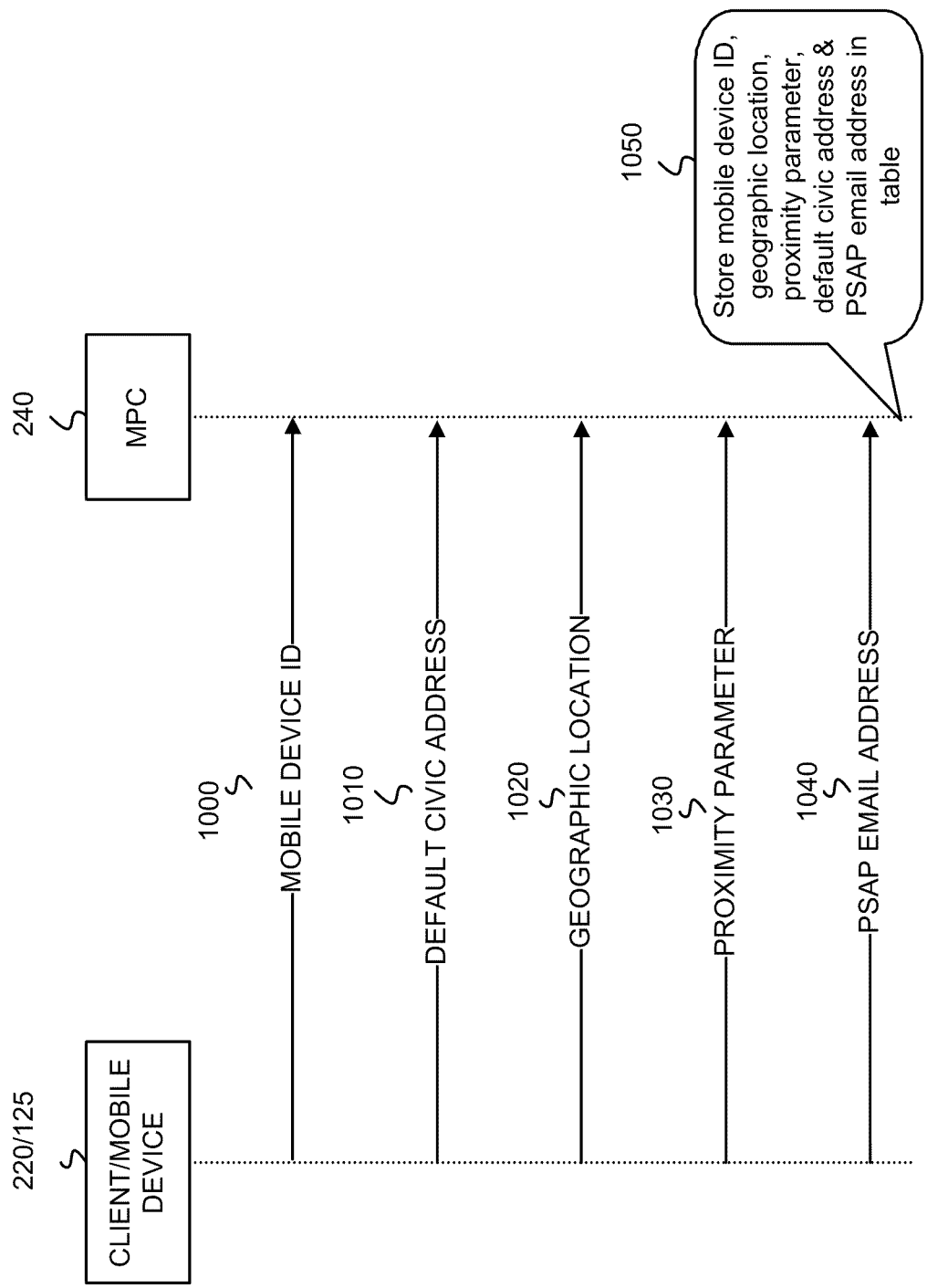
FIG. 10 is a messaging diagram associated with the exemplary process of FIG. 8.

FIG. 8 is a flow diagram illustrating an exemplary process for receiving and storing default civic addresses and associated data. The exemplary process may be performed by MPC 240, mobile device 125, or by another device (e.g., a server). The exemplary process of FIG. 8 may be described below with reference to the messaging diagram of FIG. 10.

Figure 9:
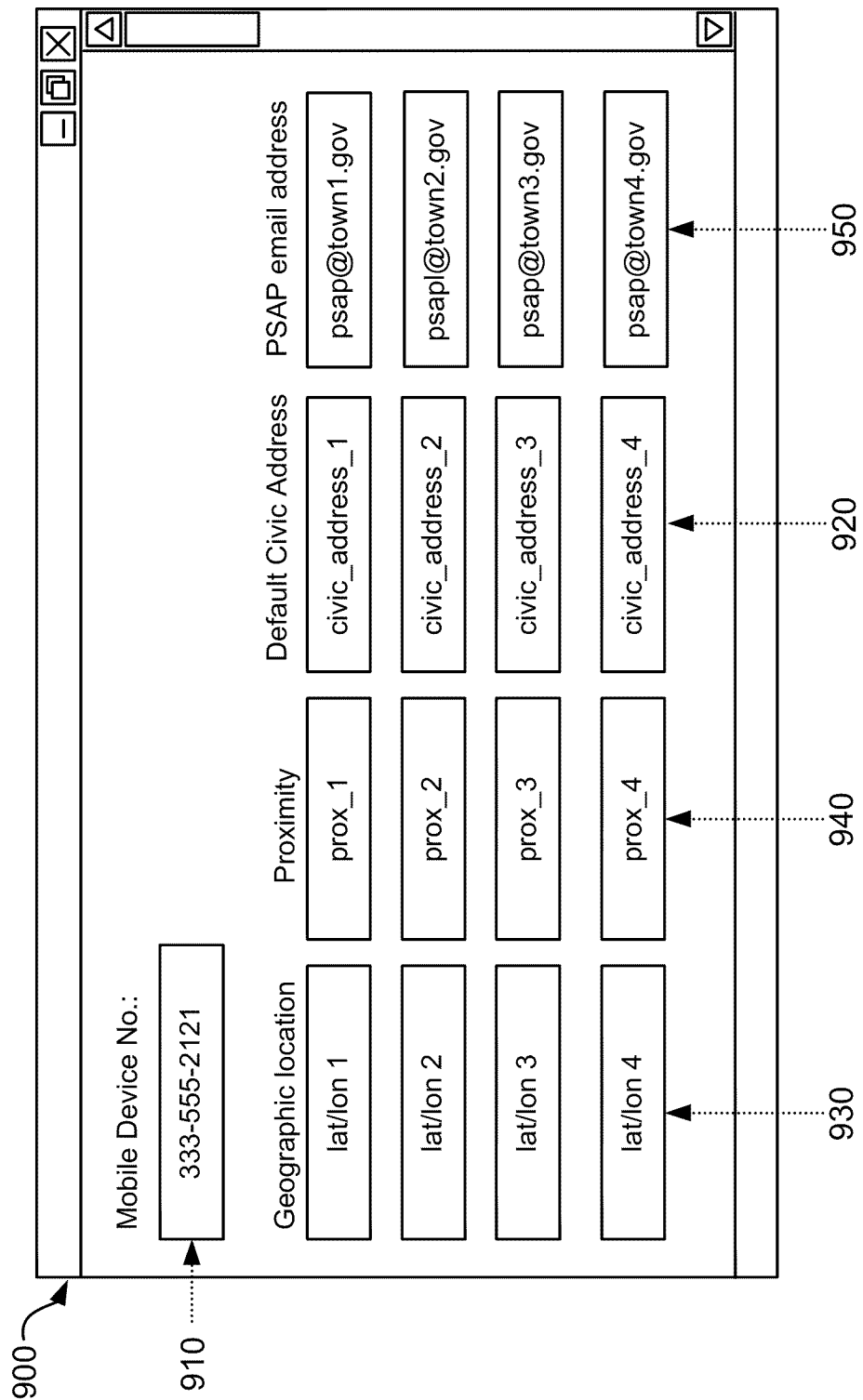
FIG. 9 is a diagram of an exemplary user interface that may be used in conjunction with the exemplary process of FIG. 8.

The exemplary process may include receiving an identifier of a mobile device (block 800). For example, as shown in FIG. 9, a user, via mobile device 125 or client 220, may, using a user interface 900, provide the mobile device identifier. As depicted in FIG. 9, the user may enter a mobile device number in a field 910 of user interface 900. In the messaging diagram of FIG. 10, which depicts an exemplary implementation in which default civic addresses and associated data is sent to MPC 240, client 220 or mobile device 125 is shown as sending a mobile device identifier 1000 to MPC 240.

A default civic address may be received (block 810). Referring to the example of FIG. 9, a user may enter a default civic address in a default civic address field 920 of user interface 900. As further shown in the messaging diagram of FIG. 10, client 220 or mobile device 125 may send the entered default civic address value 1010 to MPC 240.

A geographic location associated with the default civic address may be received (block 820). Referring again to the example of FIG. 9, a user may enter a geographic location, in a geographic location field 930 of user interface 900, in association with a previously entered default civic address. As depicted in the messaging diagram of FIG. 10, client 220 or mobile device 125 may send the entered geographic location value 1020 to MPC 240.

A proximity parameter associated with the geographic location of the default civic address may be received (block 830). Referring once again to the example of FIG. 9, a user may enter a proximity parameter value, in a proximity field 940, in association with the previously entered geographic location and default civic address values. As further depicted in the messaging diagram of FIG. 10, client 220 or mobile device 125 may send the entered proximity parameter value 1030 to MPC 240.

An email address associated with a PSAP that may service E9-1-1 calls from the identified mobile device may be received (block 835). Alternatively, or additionally, the SMS address or MMS address associated with the PSAP may be received. Referring again to the example of FIG. 9, a user may enter a PSAP email address, in a PSAP email address field 950, in association with the previously entered geographic location, default civic address and proximity values. As further depicted in the messaging diagram of FIG. 10, client 220 or mobile device 125 may send the entered PSAP email address value 1040 to MPC 240. In an alternative implementation, MPC 240 may obtain the appropriate PSAP email address based on, for example, mobile device 125's ID and/or geographic location. For example, MPC 240, or an external entity, may maintain a database from which an appropriate PSAP, and PSAP email address, may be identified based on the mobile device 125's ID and/or geographic location.

The mobile device identifier, geographic location, proximity parameter, default civic address and PSAP email address may be stored in a table entry of table 700 (block 840). As shown in the messaging diagram of FIG. 10, MPC 240 may store 1050 the mobile device ID, geographic location, proximity parameter and default civic address values in table 700. For example, referring to FIG. 7, MPC 240 may store the mobile device ID value in mobile device ID field 720, the geographic location value in geographic location field 740, the proximity parameter value in proximity field 750, the default civic address value in default civic address field 730, and the PSAP email address in PSAP email address field 760 of a single entry 710 of table 700. The exemplary process of FIG. 8 may be repeated for each default civic address entered by a user of mobile device 125.

Figure 11:
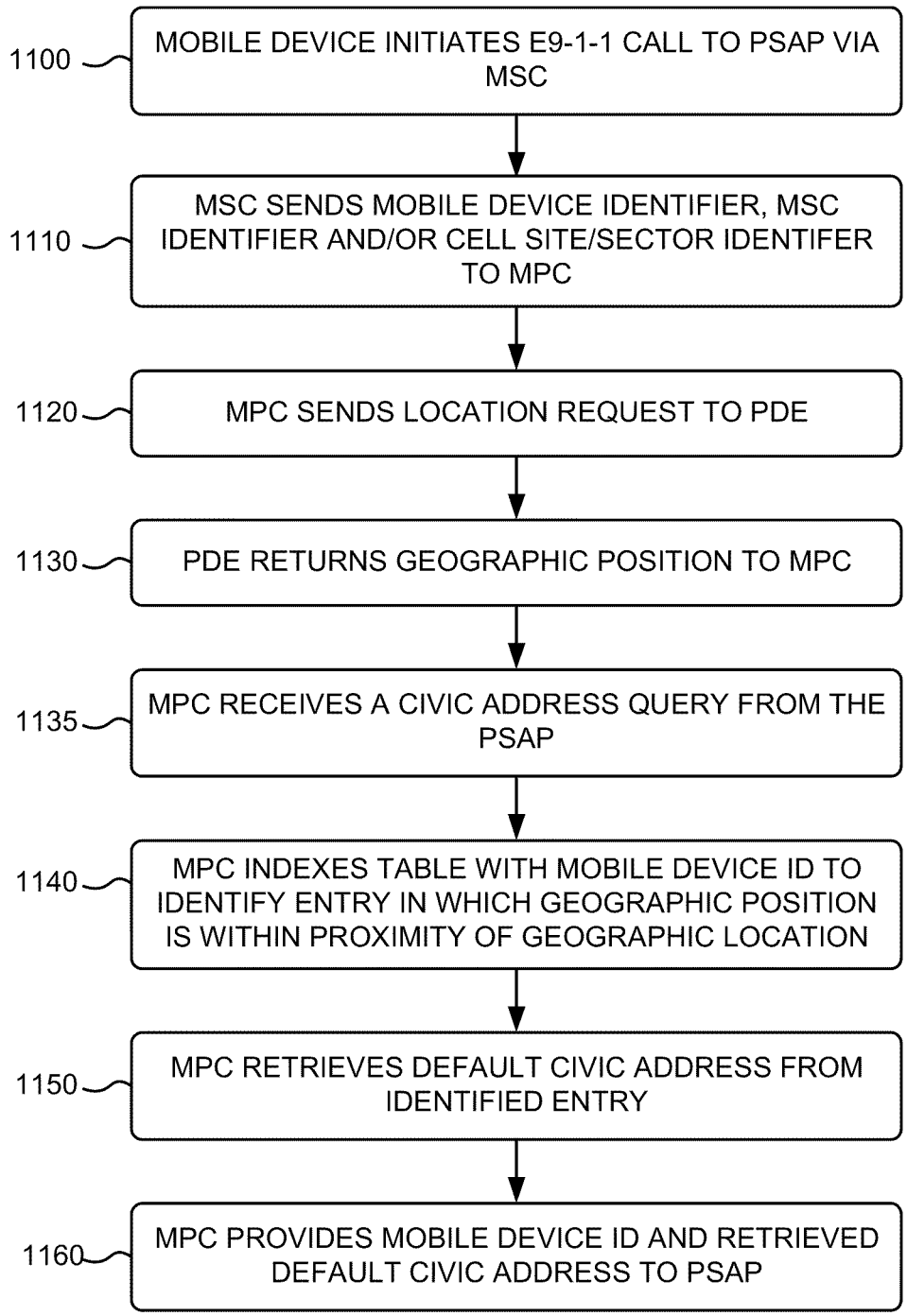
FIG. 11 is a flow diagram illustrating an exemplary process for providing a default civic address to a PSAP based on a geographic position of a mobile device initiating an emergency call, where the default civic address is provided by network-based components.

FIG. 11 is a flow diagram illustrating an exemplary process for providing a default civic address to a PSAP based on a geographic position of a mobile device initiating an emergency call, where the default civic address is provided by network-based components. In the exemplary process of FIG. 11, components of network 260 obtain and supply a default civic address associated with a geographic position of mobile device 125 to PSAP 250 when mobile device 125 initiates an emergency call to PSAP 250. The exemplary process of FIG. 11 may be described below with reference to the messaging diagram of FIG. 12.

Figure 12:
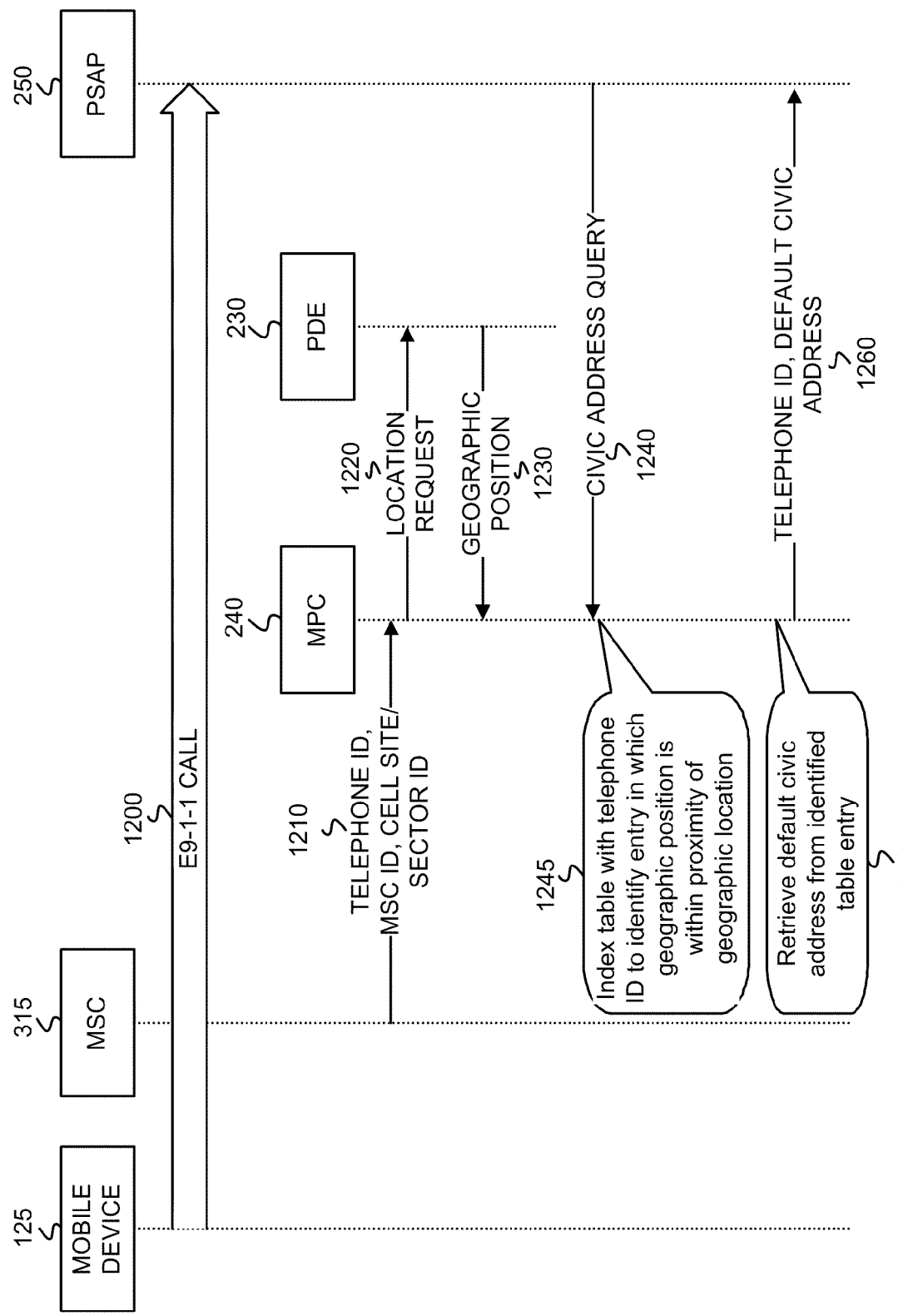
FIG. 12 is a messaging diagram associated with the exemplary process of FIG. 11.

The exemplary process may include mobile device 125 initiating an emergency 9-1-1 call to PSAP 150 via MSC 315 (block 1100). For example, referring to FIG. 12, mobile device 125 may initiate an E9-1-1 call 1200 with PSAP 250. Upon receipt of E9-1-1 call 1200, PSAP 250 may wait for MPC 240 to supply a default civic address associated with a geographic position of mobile device 125. MSC 315 may send a mobile device identifier, MSC identifier and/or cell site/sector identifier to MPC 240 (block 1110). Upon receipt of the emergency 9-1-1 call, as the call traverses to PSAP 250, MSC 315 may, as shown in FIG. 12, obtain mobile device 125's telephone ID, MSC 315's identifier, and/or a cell site/sector identifier associated with mobile device 125. MSC 315 may send 1210 the obtained telephone ID, MSC ID and/or cell site/sector ID to MPC 240.

MPC 240 may send a location request to PDE 230 (block 1120). Upon receipt of the telephone ID, MSC ID and/or cell site/sector ID from MSC 315, MPC may, as shown in FIG. 12, initiate a location request 1220 to PDE 230. PDE 230 may return a geographic position of mobile device 125 to MPC 240 (block 1130). PDE 230, upon receipt of location request 1220 from MPC 240, may obtain a geographic position of mobile device 125 (e.g., a latitude and longitude) and may return a message 1230 with the geographic position. Based on receipt of E9-1-1 call 1200, PSAP 250 may send a civic address query message 1240 to MPC 240.

MPC 240 may receive civic address query message 1240 from PSAP 250 (block 1135). In response to the civic address query message, MPC 240 may index table 700 with the mobile device ID to identify an entry in which the geographic position is within the proximity parameter of the geographic location (block 1140). For example, referring to FIG. 7, MPC 240 may use the telephone ID received from MSC 315 to find a matching value in mobile device ID field 720 of entries 710 of table 700. When MPC 240 finds an entry 710 with a value in mobile device ID field 720 that matches the telephone ID received from MSC 315, MPC 240 may determine if the geographic position received from PDE 230 is close enough to the geographic location stored in geographic location field 740 of entry 710 such that the geographic position is within a distance, specified by the proximity value stored in proximity field 750 of entry 710, of the value stored in geographic location field 740. The entry 710 of table 700, where mobile device 125's geographic position is within the proximity parameter of the value stored in geographic location field 740, may be identified as the entry from which the value stored in default civic address field 730 may be retrieved in block 1140. FIG. 12 depicts MPC 240 indexing 1245 the table with the received telephone ID to identify the table entry in which mobile device 125's geographic position is within proximity of the table entry's value stored in the geographic location field.

MPC 240 may retrieve a default civic address from the entry of table 700 identified in block 1140 (block 1150). As shown in the messaging diagram of FIG. 12, MPC 240 may retrieve 1250 the value stored in default civic address field 730 of the entry 710 of table 700 identified in block 1140. MPC 240 may provide the mobile device ID and retrieved default civic address to PSAP 250 (block 1160). As shown in the messaging diagram of FIG. 12, MPC 240 may send a message 1260 to PSAP 250 that includes mobile device 125's telephone ID, and the default civic address retrieved in block 1150. An operator at PSAP 250 may use the default civic address received from MPC 240 to dispatch appropriate emergency services to the street address represented by the default civic address. Message 1260 may include any type of message, including, for example, a SMS text message, an MMS message an email, etc. If message 1260 includes an MMS message or an email message, then message 1260 may include an image of the default civic address (e.g., a map image with streets, etc.) that may assist emergency responders in identifying the location of the emergency as they arrive at the location.

Figure 13:
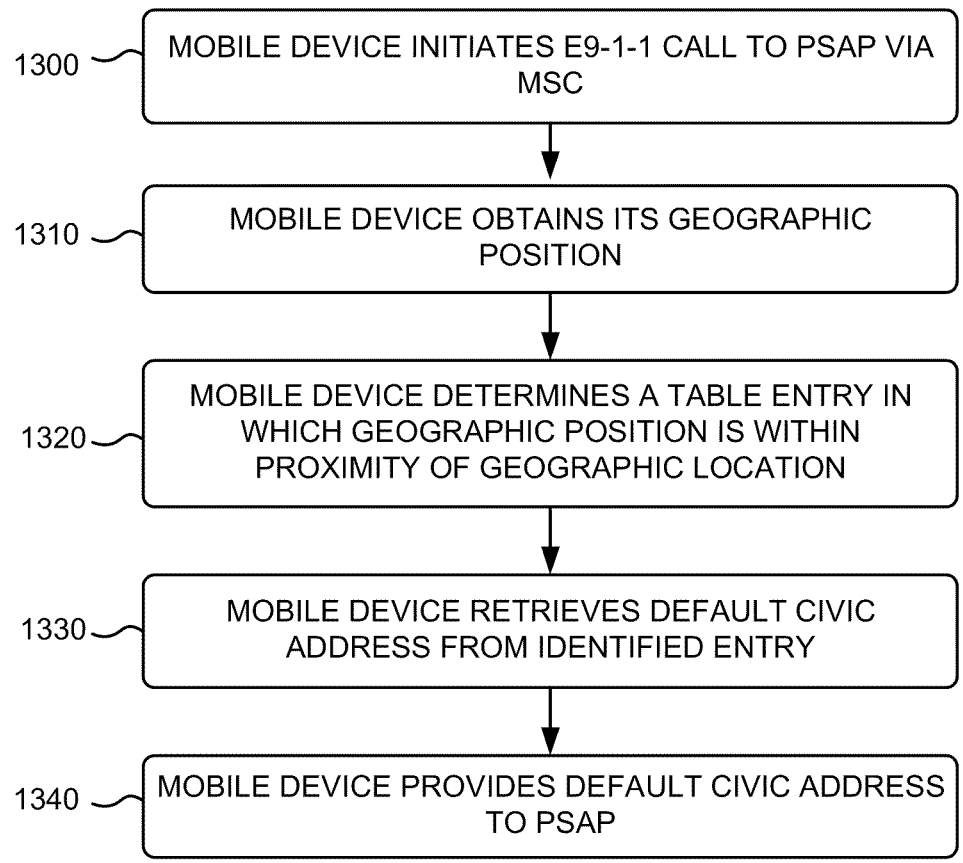
FIG. 13 is a flow diagram illustrating an exemplary process for providing a default civic address to a PSAP based on a geographic position of a mobile device initiating an emergency call, where the default civic address is provided to the PSAP by the mobile device itself.

FIG. 13 is a flow diagram illustrating an exemplary process for providing a default civic address to a PSAP based on a geographic position of a mobile device initiating an emergency call, where the default civic address is provided to the PSAP by the mobile device itself. The exemplary process of FIG. 13 may be implemented by mobile device 125. The exemplary process of FIG. 13 may be described below with reference to the messaging diagram of FIG. 14.

Figure 14:
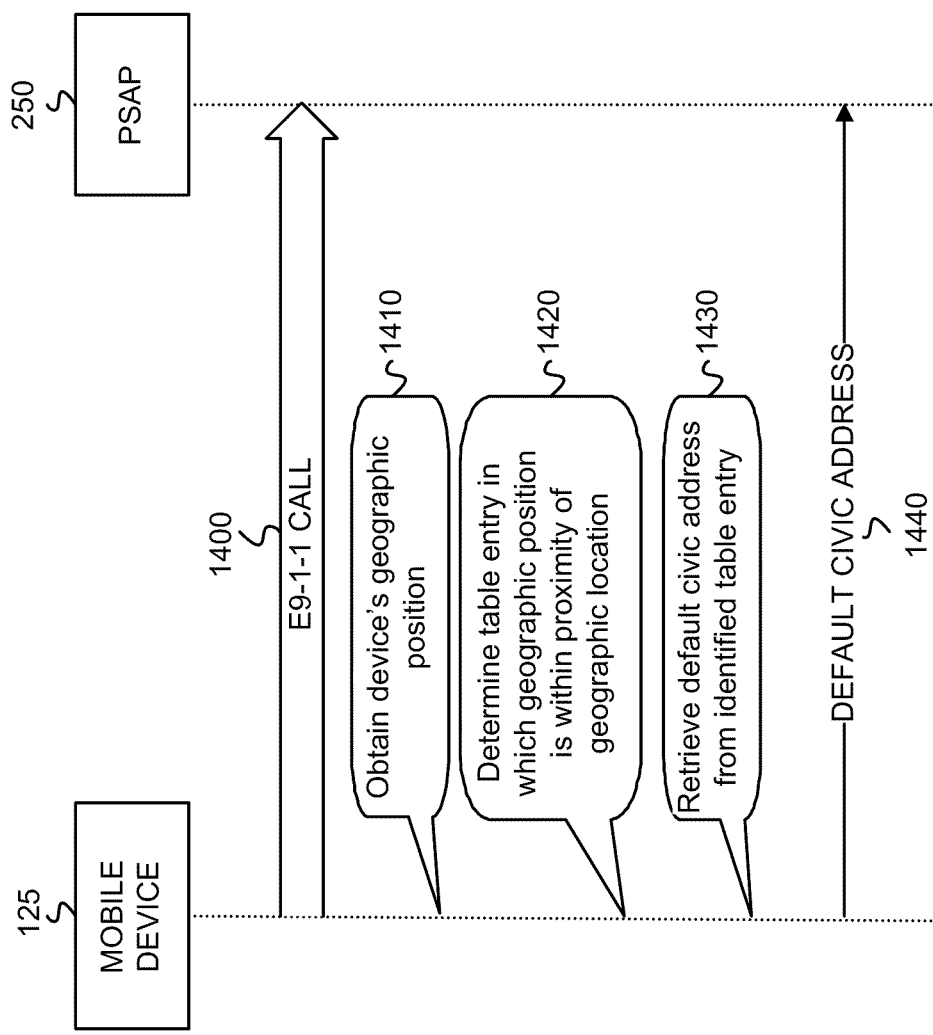
FIG. 14 is a messaging diagram associated with the exemplary process of FIG. 13.

The exemplary process may include mobile device 125 initiating an emergency 9-1-1 call to PSAP 250 (block 1300). As shown in the messaging diagram of FIG. 14, mobile device 125 may initiate an E9-1-1 call 1400 with PSAP 250. Mobile device 125 may obtain its geographic position (block 1310). Mobile device 125 using, for example, geographic position unit 415, may obtain mobile device 125's current geographic position. The geographic position may include, for example, a latitude and longitude of mobile device 125's geographic position. FIG. 14 depicts mobile device 125 obtaining 1410 the device's geographic position.

Mobile device 125 may determine an entry of table 700 in which the obtained geographic position is within a proximity parameter of the entry's geographic location (block 1320). For example, referring to FIG. 7, mobile device 125 may use mobile device 125's telephone ID to find a matching value in mobile device ID field 720 of entries 710 of table 700. When mobile device 125 finds an entry 710 with a value in mobile device ID field 720 that matches the telephone ID, mobile device 125 may determine if the geographic position obtained from geographic position unit 415 is close enough to the geographic location stored in geographic location field 740 of entry 710 such that the geographic position is within a distance, specified by the proximity value stored in proximity field 750 of entry 710, of the value stored in geographic location field 740.

The entry 710 of table 700, where mobile device 125's geographic position is within the proximity parameter of the value stored in geographic location field 740, may be identified as the entry from which the value stored in default civic address field 730 may be retrieved in block 1330. FIG. 14 depicts mobile device 125 determining 1420 the table entry in which mobile device 125's geographic position is within the proximity of the entry's geographic location value.

Mobile device 125 may retrieve a default civic address from the entry of table 700 identified in block 1320 (block 1330). In the messaging diagram of FIG. 14, mobile device 125 retrieves 1430 the default civic address from the identified entry of table 700. Mobile device 125 may provide the default civic address to PSAP 250 (block 1340). In some implementations, mobile device 125 may provide (e.g., via email or MMS message) the default civic address to PSAP 250 via a SMS text message, an Instant Message (IM), an email, an MMS message, or via other types of electronic messages. Mobile device 125 may provide, in addition to the default civic address, a map image (e.g., identifying streets, etc.), or a link to a map image, to the PSAP 250 depicting the default civic address and the surrounding area which may assist emergency responders in identifying the location of the emergency as they arrive at the location. In other implementations, mobile device 125 may provide an audio recording, pre-recorded by the user of mobile device 125, which includes an audio message that specifies the default civic address. Mobile device 125 may inject the audio message on the voice path for the E9-1-1 call when the E9-1-1 call is placed to PSAP 250. In an implementation in which mobile device 125 provides the default civic address via email, mobile device 125 may retrieve a PSAP email address from PSAP email address field 760 of an entry 710 of table 700 that corresponds to the current geographic location of mobile device 125, and may send the email to the retrieved PSAP email address. The message sent from mobile 125 (e.g., SMS text, IM, email, audio recording, etc.) may include information about the owner of mobile device 125, such as, for example, medical information about the owner that the owner may wish first responders to be aware of As shown in FIG. 14, mobile device 125 may send a message 1440 to PSAP 250 that includes the default civic address. An operator at PSAP 250 may use the default civic address received from MPC 240 to dispatch appropriate emergency services to the street address represented by the default civic address.

Exemplary embodiments described herein enable the determination of a default civic address associated with a location of a mobile device initiating an emergency 9-1-1 call. At the time a mobile device initiates an emergency 9-1-1 call, a geographic position of the mobile device may be determined, and the geographic position may be compared with geographic locations stored in a table to determine if the geographic position of the mobile device is within a distance less than a proximity parameter of one of the stored geographic locations. If the geographic position of the mobile device is within a distance less than the proximity parameter of one of the stored geographic locations, a corresponding default civic address may be retrieved from memory and returned to the Public Safety Answering Point (PSAP) so that the PSAP may identify the civic address from which the E9-1-1 was made so as to dispatch appropriate emergency services to the street address corresponding to the civic address.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 8, 11 and 13, the order of the blocks may be modified in other embodiments. Further, non-dependent blocks may be performed in parallel.

Certain features described above may be implemented as "logic" that performs one or more functions. This logic may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving a mobile device identifier associated with a mobile device, wherein the mobile device is used by a user;
   receiving, at the mobile device from the user, a first user-selected street address;
   receiving, at the mobile device, a first geographic location associated with the first user-selected street address;
   receiving, at the mobile device from the user, a first user-specified proximity parameter that defines a first maximum distance relative to the first geographic location;
   receiving, at the mobile device from the user, a second user-selected street address;
   receiving, at the mobile device, a second geographic location associated with the second user-selected street address;
   receiving, at the mobile device from the user, a second user-specified proximity parameter that defines a second maximum distance relative to the second geographic location, wherein the second user-specified proximity parameter is different than the first user-specified proximity parameter;
   causing a first Public Safety Answering Point (PSAP) electronic address, associated with a first PSAP, to be identified and retrieved from a database external to the mobile device based on the mobile device identifier and the first geographic location;
   causing a second PSAP electronic address, associated with a second PSAP, to be identified and retrieved from the database external to the mobile device based on the mobile device identifier and the second geographic location;
   storing the first user-selected street address, the first geographic location, the first user-specified proximity parameter, and the first PSAP electronic address in a first entry of a data structure in a memory of the mobile device;
   storing the second user-selected street address, the second geographic location, the second user-specified proximity parameter, and the second PSAP electronic address in a second entry of the data structure in the memory of the mobile device;
   obtaining, based on an initiation of an emergency call at the mobile device, a current geographic position of the mobile device;
   identifying, based on the initiation of the emergency call at the mobile device, a certain entry of the data structure in the memory of the mobile device in which the current geographic position of the mobile device is within a certain user-specified proximity parameter of a certain geographic location corresponding to the certain entry,
   wherein the certain entry comprises the first entry, the certain user-specified proximity parameter comprises the first user-specified proximity parameter, and the certain geographic location comprises the first geographic location, or
   wherein the certain entry comprises the second entry, the certain user-specified proximity parameter comprises the second user-specified proximity parameter, and the certain geographic location comprises the second geographic location;
   retrieving a default civic address and a certain PSAP electronic address from the identified, certain entry of the data structure,
   wherein the default civic address comprises the first user-selected street address and the certain PSAP electronic address comprises the first PSAP electronic address; or
   wherein the default civic address comprises the second user-selected street address and the certain PSAP electronic address comprises the second PSAP electronic address; and
   using the retrieved certain PSAP electronic address to send the retrieved default civic address to a certain PSAP for dispatching emergency services to the default civic address,
   wherein the certain PSAP comprises the first PSAP or the second PSAP.

2. The method of claim 1, wherein the first user-selected street address or the second user-selected street address further includes a building, floor and room designation within buildings located at the street address.

3. The method of claim 1, wherein the first PSAP electronic address and the second PSAP electronic address each comprises an Instant Message (IM) address, a Short Message Service (SMS) address, an e-mail address or, a Multimedia Message Service (MMS) address.

4. A device, comprising:
   a memory;
   a communication interface;
   an input device configured to implement a graphical user interface; and
   a processing unit configured to:
     receive a device identifier associated with the device, wherein the device is used by a user,
     receive, from the user via the graphical user interface, a first user-selected street address,
     receive, from the user via the graphical user interface, a first geographic location associated with the first user-selected street address,
     receive, from the user via the graphical user interface, a first user-specified proximity parameter that defines a first maximum distance relative to the first geographic location,
     receive, from the user via the graphical user interface, a second user-selected street address,
     receive, from the user via the graphical user interface, a second geographic location associated with the second user-selected street address,
     receive, from the user via the graphical user interface, a second user-specified proximity parameter that defines a second maximum distance relative to the second geographic location, wherein the second user-specified proximity parameter is different than the first user-specified proximity parameter,
     cause a first Public Safety Answering Point (PSAP) electronic address, associated with a first PSAP, to be identified and retrieved from a database external to the device based on the device identifier and the first geographic location, cause a second PSAP electronic address, associated with a second PSAP, to be identified and retrieved from the database external to the device based on the device identifier and the second geographic location, store the first user-selected street address, the first geographic location, the first user-specified proximity parameter, and the first PSAP electronic address in a first entry of a data structure in a memory of the device, store the second user-selected street address, the second geographic location, the second user-specified proximity parameter, and the second PSAP electronic address in a second entry of the data structure in the memory of the device, obtain, based on an initiation of an emergency call at the device, a current geographic position of the device, identify, based on the initiation of the emergency call at the device, a certain entry of the data structure in the memory of the device in which the current geographic position of the device is within a certain user-specified proximity parameter of a certain geographic location corresponding to the certain entry, wherein the certain entry comprises the first entry, the certain user-specified proximity parameter comprises the first user-specified proximity parameter, and the certain geographic location comprises the first geographic location, or wherein the certain entry comprises the second entry, the certain user-specified proximity parameter comprises the second user-specified proximity parameter, and the certain geographic location comprises the second geographic location;

retrieve a default civic address and a certain PSAP electronic address from the identified, certain entry of the data structure, wherein the default civic address comprises the first user-selected street address and the certain PSAP electronic address comprises the first PSAP electronic address; or wherein the default civic address comprises the second user-selected street address and the certain PSAP electronic address comprises the second PSAP electronic address; and use the retrieved certain PSAP electronic address to send the retrieved default civic address to a certain PSAP for dispatching emergency services to the default civic address, wherein the certain PSAP comprises the first PSAP or the second PSAP.

5. The method of claim 1, wherein the emergency call at the mobile device comprises an emergency 9-1-1 call.

6. The method of claim 1, wherein the first user-selected street address and the second user-selected street address include an address and location to which emergency services are to be dispatched in the event of the emergency call at the mobile device.

7. The method of claim 1, wherein identifying the certain entry of the data structure comprises:

retrieving the first geographic location and the first user-specified proximity parameter from the first entry of the data structure of the mobile device;

determining if the current geographic position of the mobile device is within the first maximum distance, defined by the first user-specified proximity parameter, of the first geographical location; and identifying the first entry as the certain entry if the current geographic position of the mobile device is within the first maximum distance of the first geographical location.

8. The method of claim 7, wherein identifying the certain entry of the data structure comprises:

retrieving the second geographic location and the second user-specified proximity parameter from the second entry of the data structure of the mobile device;

determining if the current geographic position of the mobile device is within the second maximum distance, defined by the second user-specified proximity parameter, of the second geographical location; and identifying the second entry as the certain entry if the current geographic position of the mobile device is within the second maximum distance of the second geographical location.

9. The method of claim 1, further comprising:

receiving, at the mobile device from the user, a third user-selected street address;

receiving, at the mobile device, a third geographic location associated with the third user-selected street address;

receiving, at the mobile device from the user, a third user-specified proximity parameter that defines a third maximum distance relative to the third geographic location;

causing a third public Safety Answering Point (PSAP) electronic address, associated with a third PSAP, to be identified and retrieved from the database external to the mobile device based on the mobile device identifier and the third geographic location; and storing the third user-selected street address, the third geographic location, the third user-specified proximity parameter, and the third PSAP electronic address in a third entry of the data structure in the memory of the mobile device, wherein, when identifying the certain entry of the data structure in the memory of the mobile device in which the current geographic position of the mobile device is within a certain user-specified proximity parameter of a certain geographic location corresponding to the certain entry, the certain entry comprises the third entry, the certain user-specified proximity parameter comprises the third user-specified proximity parameter, and the certain geographic location comprises the third geographic location, wherein, when retrieving the default civic address and the certain PSAP electronic address from the identified, certain entry of the data structure, the default civic address comprises the third user-selected street address and the certain PSAP electronic address comprises the third PSAP electronic address, and wherein the certain PSAP comprises the third PSAP.

10. The device of claim 4, wherein the first user-selected street address or the second user-selected street address further includes a building, floor and room designation within buildings located at the street address.

11. The device of claim 4, wherein the first PSAP electronic address and the second PSAP electronic address each comprises an e-mail address, an Instant Message (IM) address, a Short Message Service (SMS) address, or a Multimedia Message Service (MMS) address.

12. The device of claim 4, wherein the emergency call at the device comprises an emergency 9-1-1 call.

13. The device of claim 4, wherein the first user-selected street address and the second user-selected street address include an address and location to which emergency services are to be dispatched in the event of an emergency call from the user.

14. The device of claim 4, wherein, when identifying the certain entry of the data structure, the processing unit is further configured to:
    retrieve the first geographic location and the first user-specified proximity parameter from the first entry of the data structure of the device;
    determine if the current geographic position of the mobile device is within the first maximum distance, defined by the first user-specified proximity parameter, of the first geographical location; and
    identify the first entry as the certain entry if the current geographic position of the device is within the first maximum distance of the first geographical location.

15. The device of claim 14, wherein, when identifying the certain entry of the data structure, the processing unit is further configured to:
    retrieve the second geographic location and the second user-specified proximity parameter from the second entry of the data structure of the device;
    determine if the current geographic position of the device is within the second maximum distance, defined by the second user-specified proximity parameter, of the second geographical location; and
    identify the second entry as the certain entry if the current geographic position of the device is within the second maximum distance of the second geographical location.

16. The device of claim 4, wherein the processing unit is further configured to:
    receive, from the user via the graphical user interface, a third user-selected street address;
    receive a third geographic location associated with the third user-selected street address;
    receive, from the user via the graphical user interface, a third user-specified proximity parameter that defines a third maximum distance relative to the third geographic location;
    cause a third PSAP electronic address, associated with a third PSAP, to be identified and retrieved from the database external to the device based on the device identifier and the third geographic location; and
    store the third user-selected street address, the third geographic location, the third user-specified proximity parameter, and the third PSAP electronic address in a third entry of the data structure in the memory of the device,
    wherein, when identifying the certain entry of the data structure in the memory of the device in which the current geographic position of the device is within a certain user-specified proximity parameter of a certain geographic location corresponding to the certain entry, the certain entry comprises the third entry, the certain user-specified proximity parameter comprises the third user-specified proximity parameter, and the certain geographic location comprises the third geographic location,
    wherein, when retrieving the default civic address and the certain PSAP electronic address from the identified, certain entry of the data structure, the default civic address comprises the third user-selected street address and the certain PSAP electronic address comprises the third PSAP electronic address, and
    wherein the certain PSAP comprises the third PSAP.

17. A non-transitory computer-readable medium containing instructions executable by at least one processing unit of a mobile device, the computer-readable medium comprising one or more instructions for:
    receiving a mobile device identifier associated with the mobile device, wherein the mobile device is used by a user;
    receiving, at the mobile device from the user, a first user-selected street address;
    receiving, at the mobile device, a first geographic location associated with the first user-selected street address;
    receiving, at the mobile device from the user, a first user-specified proximity parameter that defines a first maximum distance relative to the first geographic location;
    receiving, at the mobile device from the user, a second user-selected street address;
    receiving, at the mobile device, a second geographic location associated with the second user-selected street address;
    receiving, at the mobile device from the user, a second user-specified proximity parameter that defines a second maximum distance relative to the second geographic location, wherein the second user-specified proximity parameter is different than the first user-specified proximity parameter;
    causing a first Public Safety Answering Point (PSAP) electronic address, associated with a first PSAP, to be identified and retrieved from a database external to the mobile device based on the mobile device identifier and the first geographic location;
    causing a second PSAP electronic address, associated with a second PSAP, to be identified and retrieved from the database external to the mobile device based on the mobile device identifier and the second geographic location;
    storing the first user-selected street address, the first geographic location, the first user-specified proximity parameter, and the first PSAP electronic address in a first entry of a data structure in a memory of the mobile device;
    storing the second user-selected street address, the second geographic location, the second user-specified proximity parameter, and the second PSAP electronic address in a second entry of the data structure in the memory of the mobile device;
    obtaining, based on an initiation of an emergency call at the mobile device, a current geographic position of the mobile device;
    identifying, based on the initiation of the emergency call at the mobile device, a certain entry of the data structure in the memory of the mobile device in which the current geographic position of the mobile device is within a certain user-specified proximity parameter of a certain geographic location corresponding to the certain entry,
        wherein the certain entry comprises the first entry, the certain user-specified proximity parameter comprises the first user-specified proximity parameter, and the certain geographic location comprises the first geographic location, or
        wherein the certain entry comprises the second entry, the certain user-specified proximity parameter comprises the second user-specified proximity parameter, and the certain geographic location comprises the second geographic location;
    retrieving a default civic address and a certain PSAP electronic address from the identified, certain entry of the data structure, wherein the default civic address comprises the first user-selected street address and the certain PSAP electronic address comprises the first PSAP electronic address; or wherein the default civic address comprises the second user-selected street address and the certain PSAP electronic address comprises the second PSAP electronic address; and using the retrieved certain PSAP electronic address to send the retrieved default civic address to a certain PSAP for dispatching emergency services to the default civic address, wherein the certain PSAP comprises the first PSAP or the second PSAP.

18. The non-transitory computer-readable medium of claim 17, wherein the first user-selected street address or the second user-selected street address further includes a building, floor and room designation within buildings located at the street address.

19. The non-transitory computer-readable medium of claim 17, wherein the first PSAP electronic address and the second PSAP electronic address each comprises an e-mail address, an Instant Message (IM) address, a Short Message Service (SMS) address, or a Multimedia Message Service (MMS) address.

20. The non-transitory computer-readable medium of claim 17, wherein the emergency call at the mobile device comprises an emergency 9-1-1 call.

21. The non-transitory computer-readable medium of claim 17, wherein the first user-selected street address and the second user-selected street address include an address and location to which emergency services are to be dispatched in the event of the emergency call at the mobile device.

22. The non-transitory computer-readable medium of claim 17, wherein the one or more instructions for identifying the certain entry of the data structure further comprise one or more instructions for:

retrieving the first geographic location and the first user-specified proximity parameter from the first entry of the data structure of the mobile device;

determining if the current geographic position of the mobile device is within the first maximum distance, defined by the first user-specified proximity parameter, of the first geographical location; and identifying the first entry as the certain entry if the current geographic position of the mobile device is within the first maximum distance of the first geographical location.

23. The non-transitory computer-readable medium of claim 22, wherein the one or more instructions for identifying the certain entry of the data structure further comprise one or more instructions for:

retrieving the second geographic location and the second user-specified proximity parameter from the second entry of the data structure of the mobile device;

determining if the current geographic position of the mobile device is within the second maximum distance, defined by the second user-specified proximity parameter, of the second geographical location; and identifying the second entry as the certain entry if the current geographic position of the mobile device is within the second maximum distance of the second geographical location.

24. The non-transitory computer-readable medium of claim 17, further comprising one or more instructions for:

receiving, at the mobile device from the user, a third user-selected street address;

receiving, at the mobile device, a third geographic location associated with the third user-selected street address;

receiving, at the mobile device from the user, a third user-specified proximity parameter that defines a third maximum distance relative to the third geographic location;

causing a third public Safety Answering Point (PSAP) electronic address, associated with a third PSAP, to be identified and retrieved from the database external to the mobile device based on the mobile device identifier and the third geographic location; and storing the third user-selected street address, the third geographic location, the third user-specified proximity parameter, and the third PSAP electronic address in a third entry of the data structure in the memory of the mobile device, wherein, when identifying the certain entry of the data structure in the memory of the mobile device in which the current geographic position of the mobile device is within a certain user-specified proximity parameter of a certain geographic location corresponding to the certain entry, the certain entry comprises the third entry, the certain user-specified proximity parameter comprises the third user-specified proximity parameter, and the certain geographic location comprises the third geographic location, wherein, when retrieving the default civic address and the certain PSAP electronic address from the identified, certain entry of the data structure, the default civic address comprises the third user-selected street address and the certain PSAP electronic address comprises the third PSAP electronic address, and wherein the certain PSAP comprises the third PSAP.

* * * * *